July 24, 1956
J. F. HARRISON
2,755,713
THREE-AXLE ROLLERS
Filed June 22, 1950
7 Sheets-Sheet 1
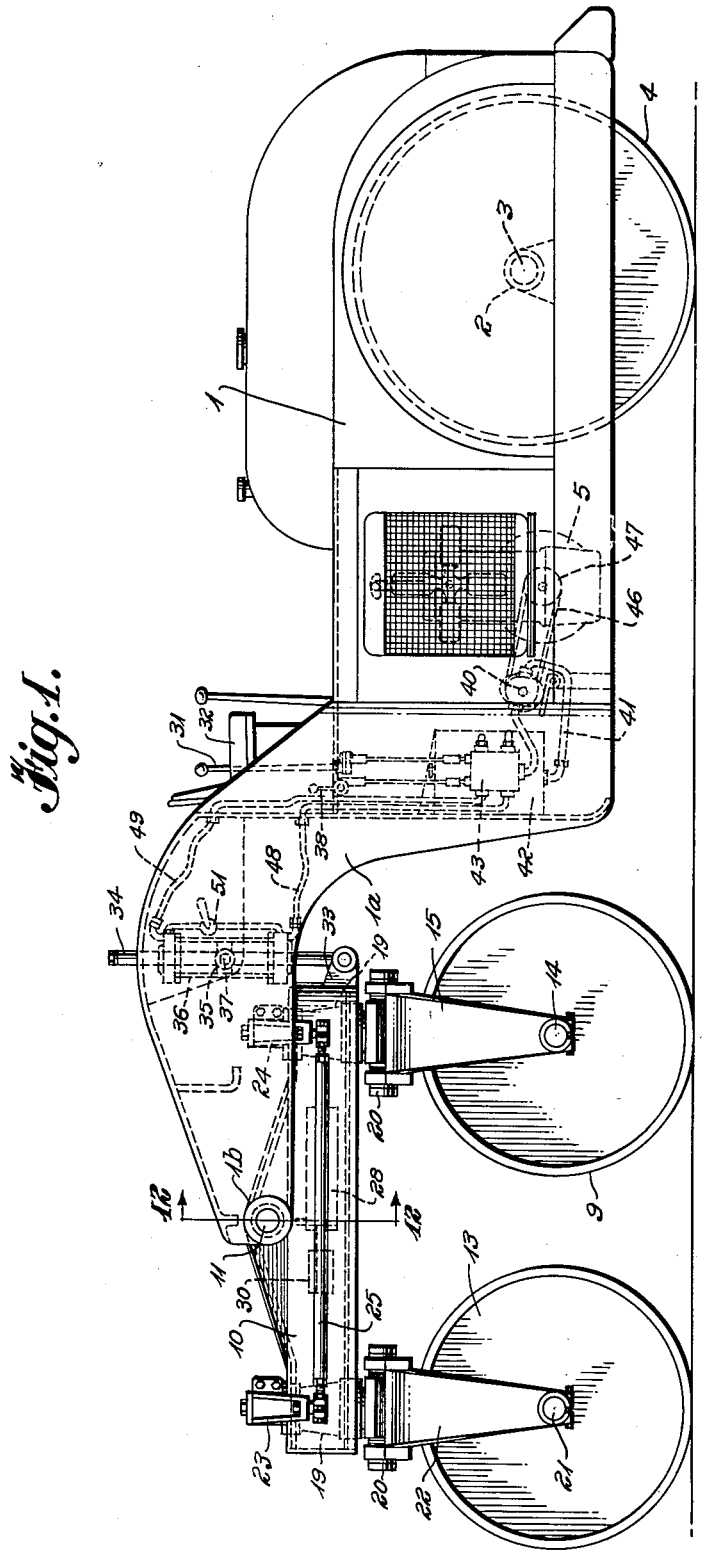
Fig. 1.
INVENTOR
John F. Harrison
ATTORNEYS July 24, 1956
J. F. HARRISON
2,755,713
THREE-AXLE ROLLERS
Filed June 22, 1950
7 Sheets-Sheet 2
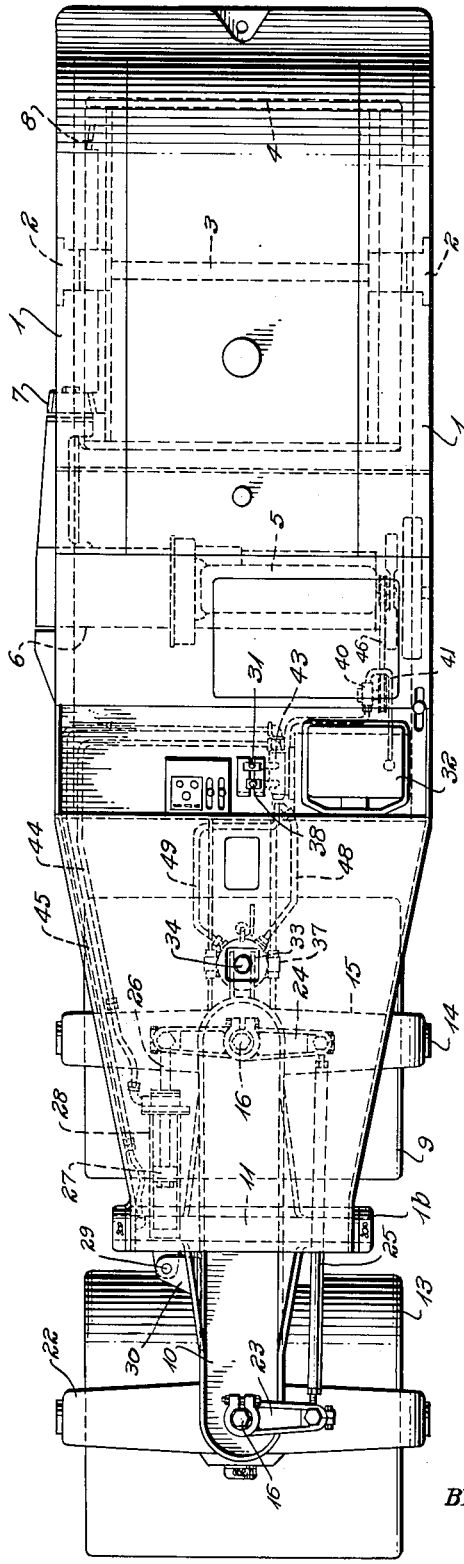
INVENTOR
John F. Harrison
ATTORNEYS July 24, 1956　　　J. F. HARRISON　　　2,755,713
THREE-AXLE ROLLERS Filed June 22, 1950　　　　　　　　　　7 Sheets-Sheet 3

INVENTOR
John F. Harrison
BY
ATTORNEYS

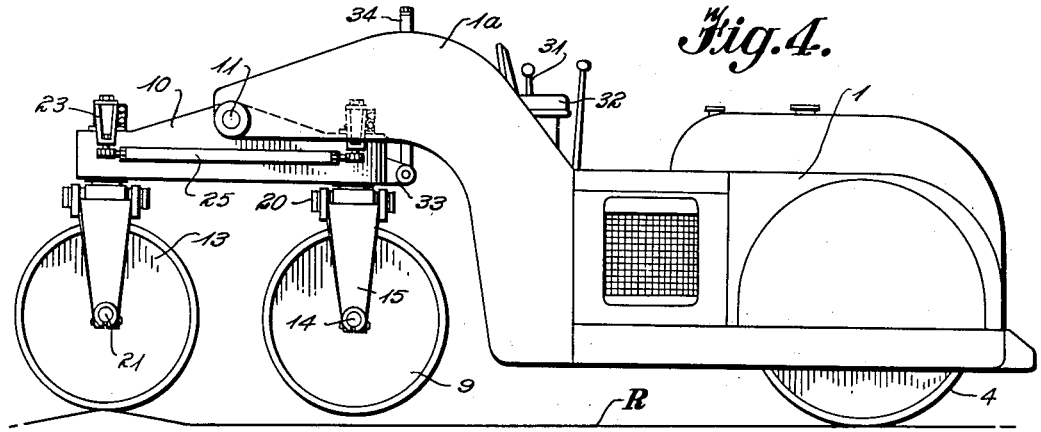
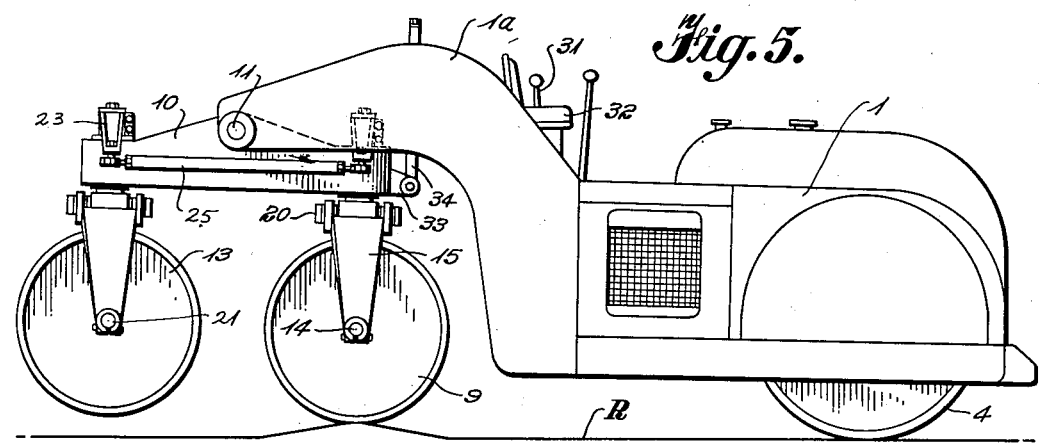
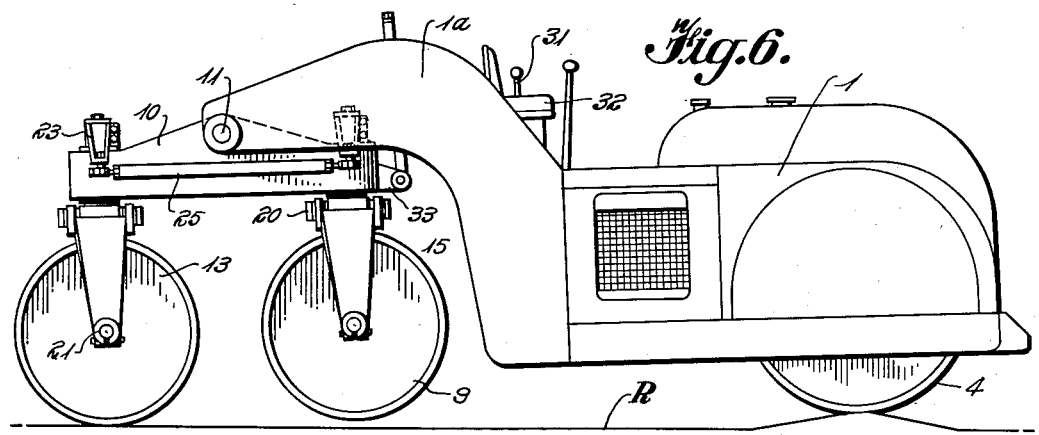

July 24, 1956
J. F. HARRISON
2,755,713
THREE-AXLE ROLLERS
Filed June 22, 1950
7 Sheets-Sheet 5
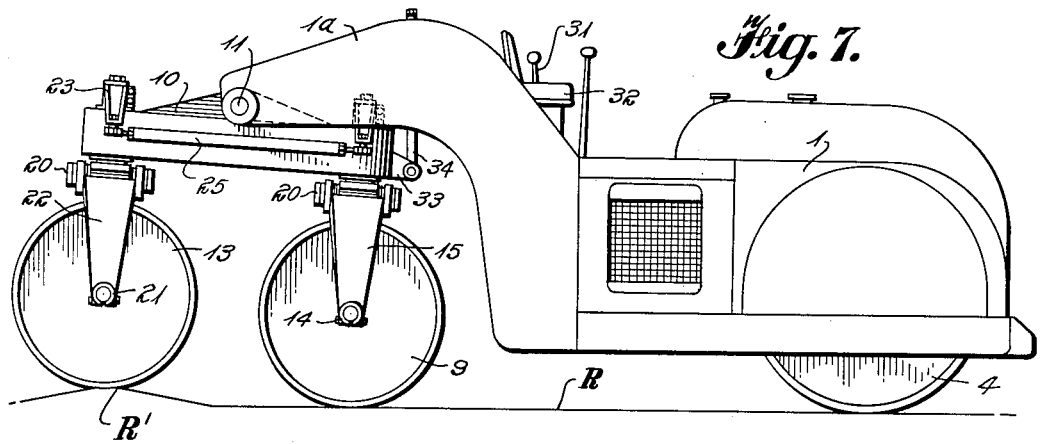
Fig. 7.
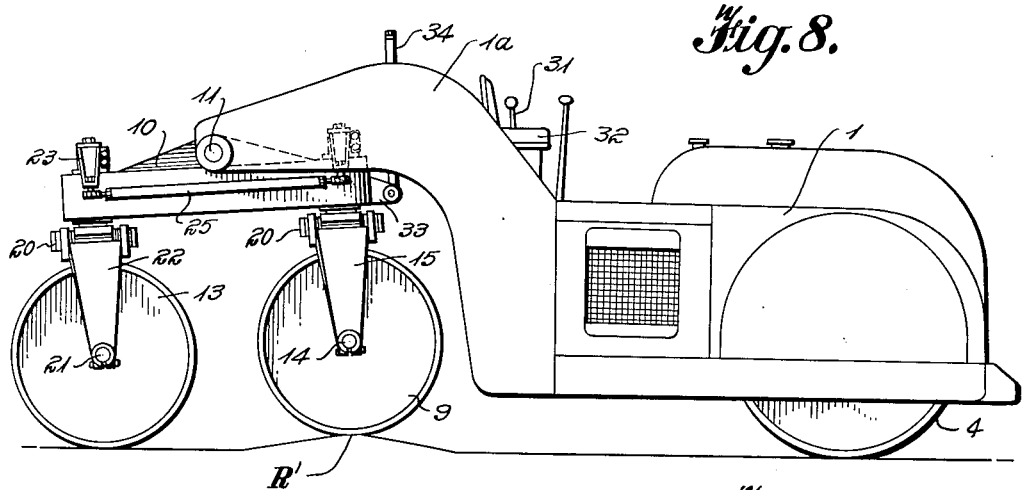
Fig. 8.
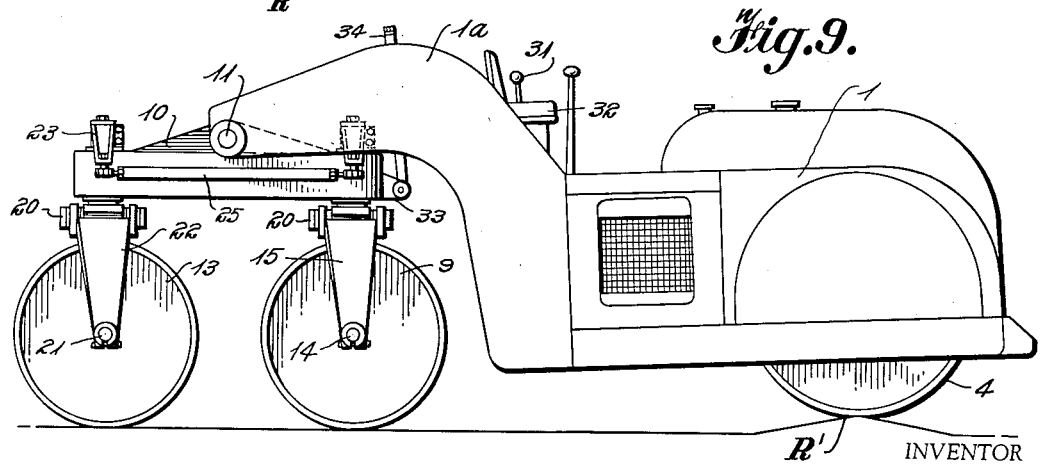
Fig. 9.
INVENTOR
John F. Harrison
BY 
ATTORNEYS July 24, 1956     J. F. HARRISON     2,755,713
THREE-AXLE ROLLERS
Filed June 22, 1950     7 Sheets-Sheet 6
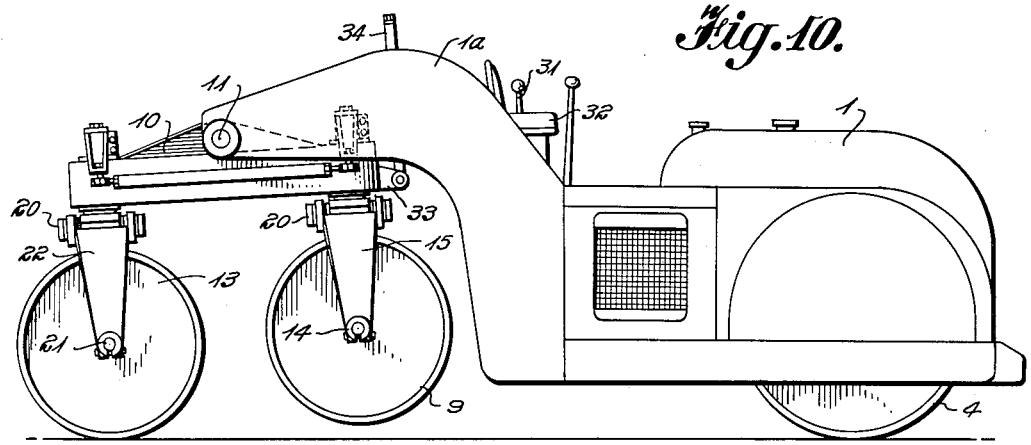
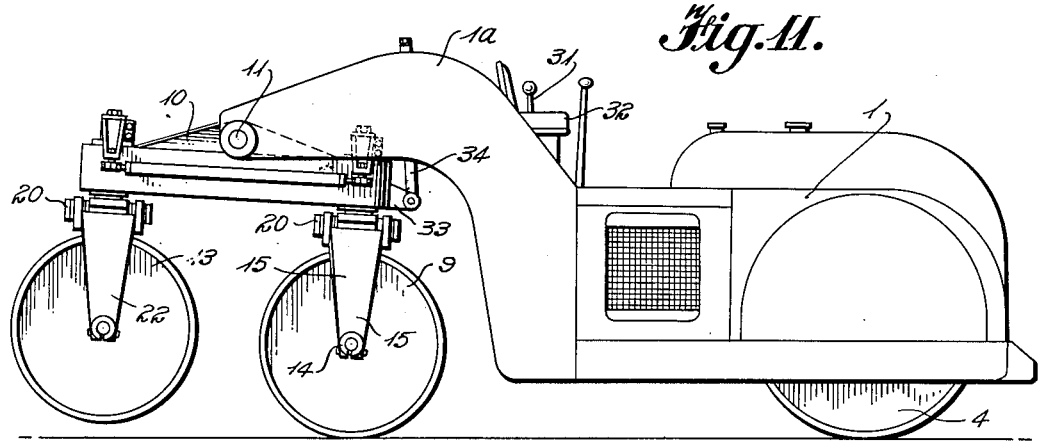
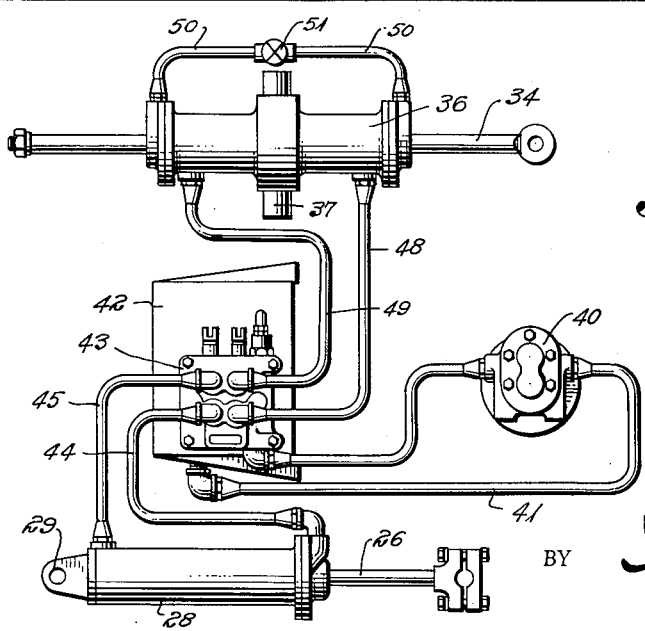
INVENTOR
John F. Harrison
BY
ATTORNEYS July 24, 1956

J. F. HARRISON 2,755,713

THREE-AXLE ROLLERS

Filed June 22, 1950

INVENTOR

John F. Harrison

BY

ATTORNEYS

United States Patent Office 2,755,713
Patented July 24, 1956

2,755,713

THREE-AXLE ROLLERS

John F. Harrison, Springfield, Ohio, assignor to The Buffalo-Springfield Roller Co., Springfield, Ohio, a corporation of Ohio Application June 22, 1950, Serial No. 169,749

14 Claims. (Cl. 94—50)

This invention relates to three-axle tandem road rollers and is an improvement on the road roller constructions shown in U. S. Letters Patent of Carl F. Greiner, No. 2,013,891, issued October 1, 1935, and of Andrew W. Aitken No. 2,089,591, issued August 10, 1937. The improvement herein disclosed, while preserving the advantages of the patented constructions, eliminates certain objections thereto and provides a road roller having wider capability of use and certain distinct advantages over the machines of said patents.

One of the chief objects of the present invention is to provide, in a road roller having a pair of steerable guide rolls and a drive roll, a mounting for the two guide rolls such that they may both maintain contact with a tangent plane which may or may not coincide with the tangent plane common to the drive roll and either of the guide rolls, in other words, a construction such that all three rolls may maintain effective contact with the surface to be rolled at all times, even though the surface does not lie in a single plane, and in which the load on any guide roll is always considerably less than the load on the drive roll.

A further object of my invention is to provide such a floating guide roll construction in which the two guide rolls and the drive roll may be maintained in contact with a single plane tangent thereto, so that the machine may function as an ordinary three-axle tandem road roller having the conventional load distribution between guide rolls and drive roll.

Another object of my invention is to provide a three-axle tandem road roller having a pair of steerable guide rolls and a drive roll, in which either guide roll may be maintained in elevated position thus causing the machine to operate as a two-axle tandem, the wheel base being longer or shorter depending upon whether the middle or leading guide roll is elevated, so that in the first case the load is distributed approximately in the conventional 2:1 ratio, while in the latter case it is distributed approximately equally between the drive roll and the contacting guide roll.

Another object of my invention is to provide a three-axle tandem in which the two steerable guide rolls are carried by a rocking frame and in which the operator may rock this frame about a horizontal axis in either direction.

In conventional two-axle machines, there is a definite accepted weight ratio between the weight at the drive roll and the weight at the guide roll. Currently, this ratio is approximately 2:1, the weight at the drive roll representing two-thirds, and the weight at the guide roll representing one-third of the total weight of the machine, i. e., the weight at the guide roll being one-half that at the drive roll.

In rolling some materials this difference in weight is necessary, because the characteristics of the material are such that the first pass of a compaction roll should be made with fairly light pressures for the initial setting. After this first pass, the following roll can be much heavier without ill effects upon the material being rolled. Consequently, the roller is applied to the fresh material with the guide roll end of the machine leading. It is understood, of course, that the actual compaction, achieving the maximum density, is accomplished by the heavier drive roll. Many materials however, such as soils, do not have the characteristics above outlined, and the guide roll has but little effect on them and functions chiefly in steering the machine. On such materials, there would need be no differential between the weight at the guide and drive rolls of the machine.

According to my novel invention, in my improved three-axle roller, free vertical flotation of both guide rolls is provided when desired or required, and continuous weight equilization is maintained between the two guide rolls when they are thus simultaneously released for vertical flotation. Further, either guide roll can be fixedly raised above the tangent plane of the rolls, thus providing the exact weight ratio characteristics of a conventional two-axle roller when desired, plus the characteristics of a two-axle roller in which the weight on both the drive roll and the guide roll is the same.

I will explain the invention with reference to the accompanying drawings, which illustrate several practical embodiments thereof, to enable others familiar with the art to adopt and use the same; and will summarize in the claims the novel features of construction, and novel combinations of parts, for which protection is desired.

In said drawings:

Figure 1 is a side elevation of one modification of my improved three-axle roller showing the guide rolls and the drive roll locked in a common plane tangent to the lower peripheries thereof.

Fig. 2 is a top plan view of the roller shown in Fig. 1.

Fig. 4 is a side elevation of the roller shown in Figs. 1, 2 and 3 showing all the rolls locked in a common tangential plane, but with the end guide roll surmounting a high spot in the material being rolled.

Fig. 5 is a view similar to Fig. 4 showing the center guide roll surmounting a high spot in the material being rolled.

Fig. 6 is a view similar to Figs. 4 and 5 showing the drive roll surmounting a high spot in the material being rolled.

Fig. 7 is a side elevation of the roller when both guide rolls have been released from the tangential plane for vertical flotation, the front guide roll surmounting a high spot in the material being rolled.

Fig. 8 is a view similar to Fig. 7 but showing the center guide roll surmounting a high spot in the material being rolled.

Fig. 9 is a view similar to Figs. 7 and 8 but showing the drive roll surmounting a high spot in the material being rolled.

Fig. 10 is a view of the roller when the center guide roll is raised above the tangential plane of the front guide roll and drive roll and is locked in said raised position.

Fig. 11 is a view similar to Fig. 10 but showing the end guide roll raised above the tangential plane and locked in said raised position.

Fig. 15 shows a conventional hydraulic circuit incorporating the pump, the valves, the hydraulic cylinder shown in Fig. 14, and the oil storage tank, for operating the beam.

Figure 12:
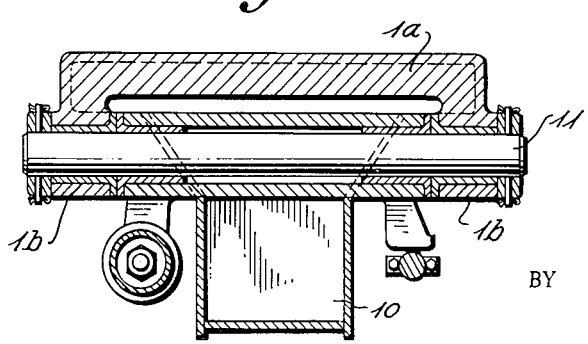
Fig. 12 is an enlarged transverse sectional view through the mounting pivot, on the line 12—12, Fig. 1.

As shown in Figs. 1–11 inclusive, my road roller is of the three-axle tandem type, and consists of a frame 10 having parallel side members 1 carrying journals 2 adjacent their rear ends for rear axle 3 which carries drive roll 4. A motor 5 is mounted in the frame for driving roll 4 in the usual manner through change-speed gearing 6 which drives a bevel gear 7 meshing with an annular ring gear 8 mounted on the end of drive roll 4. The forward ends of the side members 1 are arched upwardly, as at 1a over center roll 9, the arched portions extending forwardly of center roll 9 and terminating in aligned horizontal bearings 1b (Fig. 12) for pivot pin 11 carried by equalizer beam 10, which beam carries the center roll 9 at its rear end, and carries at its forward end an end roll 13.

Figure 13:
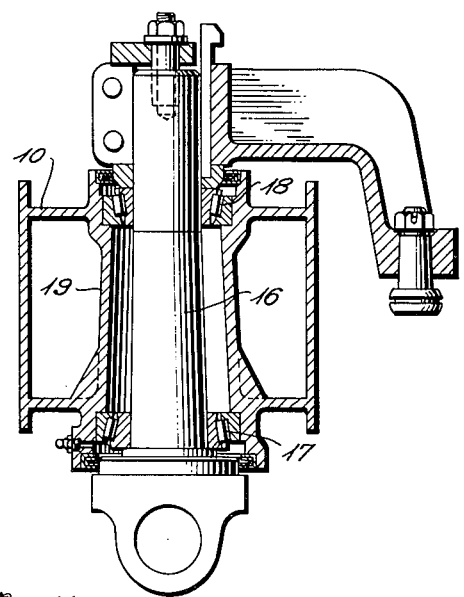
Fig. 13 is a vertical sectional view through the king pin assembly for the guide rolls.

Center roll 9, as shown, is journaled on a shaft 14 carried by yoke 15 which is provided at its center with a king pin 16 (Fig. 13) mounted in anti-friction bearings 17 and 18 in trunnion bearing 19 carried by equalizer beam 10, so that the king pin 16 may swivel on a vertical axis in trunnion bearing 19. The lower end of king pin 16 is connected by a horizontal pivot pin 20 to the center of yoke 15 whereby the yoke 15 may also pivot about an axis normal to the axis of king pin 16.

End guide roll 13 is similarly mounted on shaft 21 carried by yoke 22 which yoke 22 is likewise connected by a horizontal pivot pin 20 to a king pin 16 (Fig. 13) journaled in a trunnion bearing 19 by anti-friction bearings 17 and 18, same being disposed at the other end of equalizer beam 10, whereby the end roll 13 may also pivot on horizontal and vertical axes with respect to the road roller frame. Thus the rolls 13 and 9 are mounted to swivel about vertical axes arranged fore and aft of the horizontal axis of pivot pin 11, about which the beam 10 is rockable.

Figure 16:
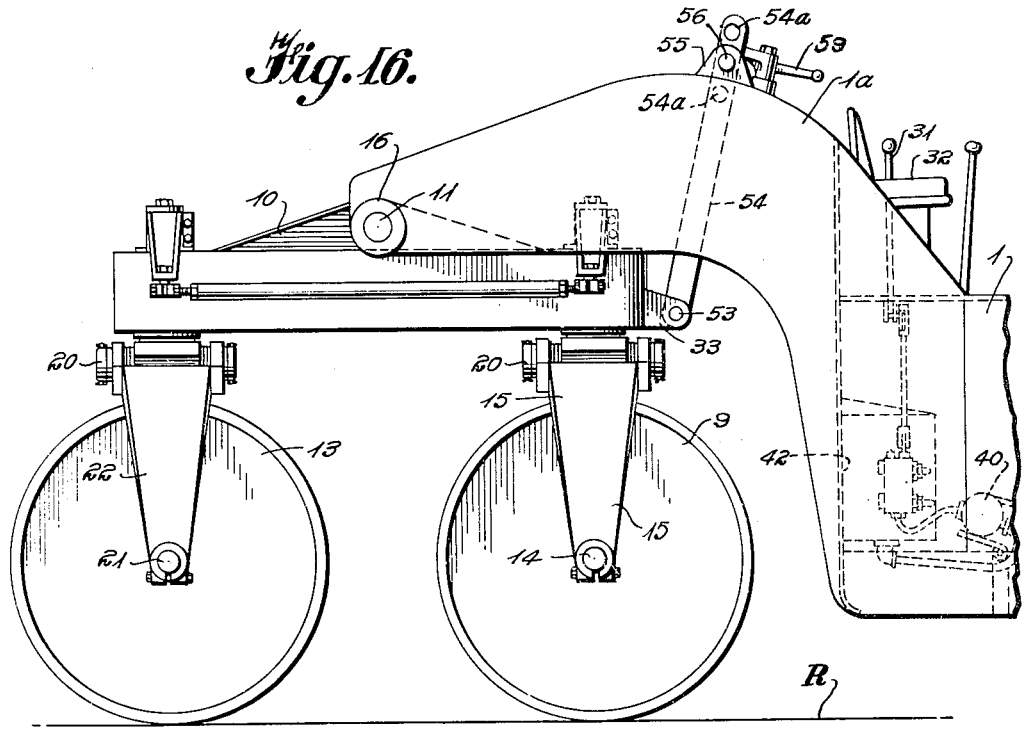
Fig. 16 is a side elevation showing a modified means for locking the beam which carries the guide rolls in any one of the three selective positions.

In order to steer the rolls 9 and 13, an arm 23 (Fig. 2) is provided on the upper end of king pin 16 of yoke 22, the same being normally disposed transversely of the axis of the road roller. A cross arm 24 is also provided on the king pin 16 (Fig. 2) of yoke 15 of center roll 9, said arm normally extending transversely of the axis of the road roller and extending at opposite sides of the equalizer beam 10. A link 25 pivotally connects the outer ends of the arm 23 with the corresponding arm 24 so that the king pins 16 of the yokes 15 and 22 for guide rolls 9 and 13 will be correspondingly simultaneously rotated on vertical axes in their trunnion castings 19. The other end of cross arm 24, at the opposite side of the axis of the road roller, is pivotally connected to a piston rod 26 (Figs. 2 and 17) carrying a piston 27 in a fluid pressure cylinder 28 pivoted as at 29 at its forward end to brackets 30 on the side of equalizer beam 10, whereby as piston 27 is shifted by fluid pressure, as hereinafter described, towards either end of cylinder 28, the king pins 16 of yokes 22 and 15 will be correspondingly pivoted in their trunnion casings 19 in the same direction. The control for admitting fluid under pressure to the ends of cylinder 28, comprises a lever 31 disposed adjacent the operator's seat 32 which is mounted upon the top of the road roller frame, as indicated in Figs. 1, 2 and 16.

Fluid pressure means for rocking equalizer beam 10 on the pin 11, to bring the lower peripheries of all the rolls 13, 9 and 4 in and out of the same common plane, is provided. At the rear end of equalizer beam 10 is a bracket 33 (Figs. 1 and 16) in which is pivotally mounted the lower end of a piston rod 34 carrying a piston 35 operating in a fluid pressure cylinder 36 which latter is pivoted at 37 in the upwardly arched portions 1a of the frame members 1, as shown in Fig. 1, whereby raising and lowering of piston 35 will rock the equalizer beam 10 on pin 11, the movement of the piston rod 34 being controlled by hydraulic means hereinafter described, the control including a valve 38 disposed adjacent the operator's seat 32, as shown in Figs. 1 and 2.

While substantially any type of mechanical or hydraulic means for operating the steering linkage, and for rocking the equalizer beam, may be used, the particular hydraulic means disclosed in Figs. 1, 2, 14 and 15 is as follows. Motor 5 drives a pump 40 (Figs. 1 and 15) which receives oil through a pipe 41 from oil tank 42 and delivers the oil to a valve casing 43 containing dual valves of any desired type, one of which controls the steering of guide rolls 9 and 13, and the other controls the rocking of equalizer beam 10. Valve casing 43 is connected by duct 44 to one end of steering cylinder 28, while the opposite end of said cylinder 28 is connected by return duct 45 with the valve casing 43, the valve being controlled, as hereinbefore mentioned, by the lever 31, so that fluid under pressure of pump 40 may be directed into either end of steering cylinder 28, the fluid from the cylinder 28 being redirected into the oil tank 42. Pump 40 is driven by a belt, chain or the like, 46 (Fig. 1) from a pulley or sprocket 47 on the shaft of the motor 5. Thus, by operating steering lever 31, the yokes 22 and 15 of end roll 13 and center roll 9 may be simultaneously pivoted in their trunnions 19 for steering purposes. The particular arrangement of the hydraulic means for steering the road roller however, forms no part of my present invention.

Dual valve casing 43 is also connected by duct 48 (Figs. 1 and 15) with the lower end of hydraulic cylinder 36, while the opposite end of said cylinder 36 is connected by a duct 49 with the valve casing 43, whereby, when the valve lever 38 is operated, fluid under pressure may be directed into either end of cylinder 36 so as to rock the piston 35 and hence the equalizer beam 10, in one direction or the other as clearly indicated in Figs. 1, 2, 14 and 15.

Figure 3:
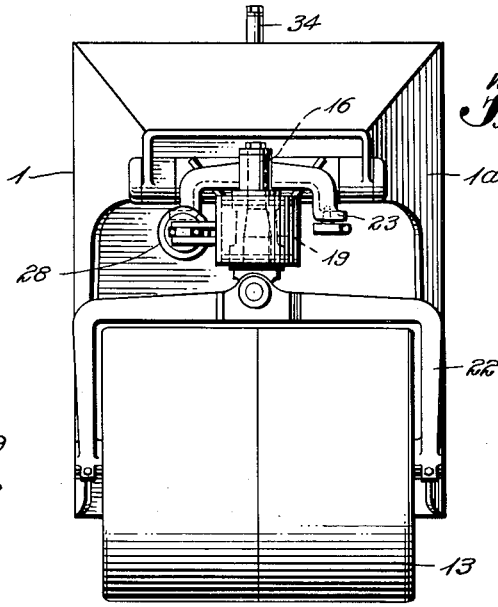
Fig. 3 is an end elevation of the roller shown in Fig. 1 looking at the front guide roll.
Figure 14:
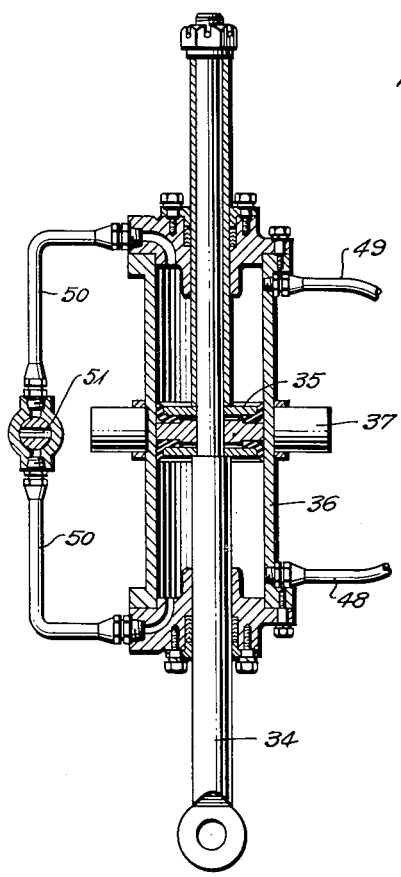
Fig. 14 is a vertical sectional view through the hydraulic beam adjusting cylinder; and through the valve which permits the piston to float freely in the cylinder, when desired.

As shown in Figs. 14 and 15, the opposite ends of cylinder 36 communicate through pipe 50 in which is disposed a valve 51 which, in Fig. 14, is shown as being closed, in which position the piston 35 may be raised or lowered with respect to cylinder 36 by admission of oil into the cylinder through the ducts 48 or 49, the fluid exhausted from the cylinder being returned to the oil tank 42 through the other of said ducts. When, however, it is desired to permit equalizer beam 10 to float freely with respect to the pivot 11, valve 51 may be opened to connect the opposite ends of cylinder 36, under which conditions the piston 35 may freely move towards either end of cylinder 36, the oil in advance of the piston 35 being by-passed through duct 50 and valve 51 into the opposite end of the cylinder, for the purpose hereinafter described.

In the construction shown in Figs. 1–15, when the valve 38 has been operated to bring the piston 35 of cylinder 36 into its mid-position with the valve 51 closed, the lower tangents of end roll 13, center roll 9 and drive roll 4, will all be disposed in the same plane. When, however (with valve 51 closed), the piston 35 is raised to the upper end (Fig. 1) of cylinder 36, beam 10 will be rocked counter-clockwise to raise the center roll 9 above the plane tangent to the end roll 13 and drive roll 4. When, however, the piston 35 (with valve 51 closed) is disposed at the lower end (Fig. 1) of cylinder 36, the beam 10 will be rocked clockwise and end roll 13 will be disposed above the plane tangent to the center roll 9 and the drive roll 4. In any position of the piston 35 and cylinder 36, when the valve 51 is open, to establish communication between the opposite ends of cylinder 36, it is obvious that the equalizer beam 10 is permitted to freely float upon the pivot pin 11 so that both the end roll 13 and the center roll 9 will always be maintained in contact with the road surface, the equalizer beam 10 rocking freely in accordance with any unevenness in the ground encountered by the end roll 13 and center roll 9.

In Fig. 1, the piston 35 is shown as being disposed at the center of the cylinder 36 so that equalizer beam 10 is disposed parallel with the overlying portions of the arches 1a of the side members 1, in which position the end roll 13, center roll 9, and drive roll 4 have their lower peripheries all disposed in the same plane. Under these conditions, if the end roll 13 should encounter a hump on the road R, as shown in Fig. 4, the center roll 9 would be raised above the ground surface R and the machine would act as a true three-axle tandem roller. Similarly, if the center roll 9 should encounter a hump in the road R, as shown in Fig. 5, the end roll 13 would be raised above the road surface R and the road roller would operate as a true three-axle tandem road roller. Under the same conditions, if the drive roll 4 should encounter a hump in the road surface R, as shown in Fig. 6, the center roll 9 would be raised above the road surface R and the road roller would operate as a true three-axle tandem road roller. It will be observed that under any of these conditions the drive roll and at least one steerable guide roll are in contact with the road surface so that the machine never loses traction or steerability.

In Fig. 7, equalizer beam 10 is permitted to float freely on the pivot pin 11, and under such conditions it will be noted that all three rolls, to-wit, end roll 13, center roll 9, and drive roll 4, are all in contact with the road surface R, notwithstanding the hump R' therein. In Fig. 8, the same conditions hold, hump R' being disposed below the center roll 9; while in Fig. 9 the same conditions hold notwithstanding the hump R' being disposed below the drive roll 4. In each of the three cases shown in Figs. 7, 8 and 9, and in fact whenever beam 10 is free to rock, the load distribution is substantially one-half on the drive roll 4 and one-quarter on each of the guide rolls 9 and 13. Thus, the first passes by the leading guide rolls will be effected by a load substantially half that on the following drive roll.

Other types of hydraulic tilting of the equalizer beam may be utilized. Also, mechanical or manually-operated means for tilting said equalizer beam with respect to the road roller frame may be utilized, said mechanical means being illustrated in Figs. 16 and 17. In this modification the ears 33 shown in the preceding figures carry pivot pin 53 for a link 54, which extends upwardly of the arched frame portions 1a and extends through a pair of ears 55 at the top of the arched portions 1a, said ears having aligned perforations for receiving a sliding bolt 56 adapted to engage one of a series of holes 54a in the link 54, three such holes being shown. Sliding bolt 56 is journaled in the ears 55 (Fig. 17) so as to be axially slidable therein, the bolt 56 having a pin 57 thereon, engaged by a slot in a bell crank lever 58, said bell crank lever having a handle 59 which is manually operable, whereby the bolt 56 may be moved axially into or out of engagement with one of the holes 54a in link 54.

As shown in Fig. 16, when the bolt 56 is engaged with the center hole 54a, the equalizer beam 10 is maintained parallel with the undersides of arched portions 1a of the roller frame, so that the lower peripheries of guide roll 13, center roll 9 and drive roll 4 are all maintained in the same horizontal plane. When, however, the sliding bolt 56 is engaged in the upper or lower holes 54a of link 54, the end roll 13 or the center roll 9 will be maintained out of the common plane of the other guide roll and drive roll.

Figure 17:
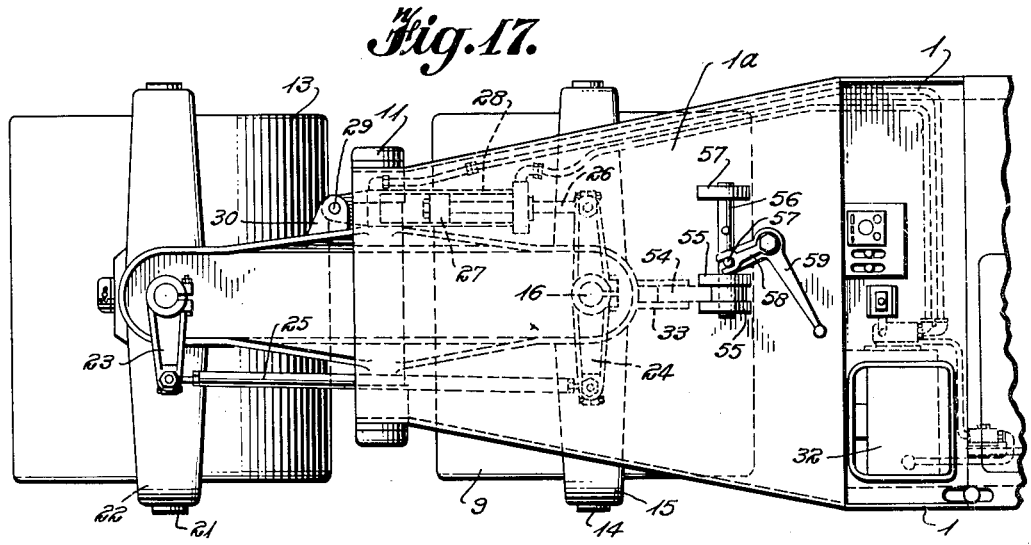
Fig. 17 is a top plan view of the parts shown in Fig. 16.

With respect to Figs. 16 and 17, if it is desired to hold the end roll 13 in a raised position, as shown in Fig. 11, the end roll 13 may conveniently be driven on to an elevated curb or the like a sufficient amount to cause the upper hole 54a to become axially aligned with slide bolt 56 and the slide bolt then engaged therewith, under which conditions the end roll 13 will remain in the elevated position shown in Fig. 11. Likewise, if it is desired to elevate the center roll 9, as in Fig. 10, it is only necessary to drive the end roll 13 into a depression sufficient to cause the lower hole 54a of link 54 to become axially aligned with slide bolt 56 so that the same may be entered therein. In both cases it is understood that these positions are achieved by withdrawing the locking bolt 56 by manually operating the lever 59. When so withdrawn, the equalizer beam 10 is free to oscillate about the pivot 11.

Since pivot 11 is midway between the king pins 16 of the yokes 22 and 15, the weight of the guide end of the machine when beam 10 is floating is divided equally between the two guide rolls 13 and 9. This free flotation feature is also achieved in the hydraulic means by operation of the valve 51 hereinbefore mentioned.

Summarizing, in conventional two-axle machines, there is a definite accepted weight ratio between the weight at the drive roll and the weight at the guide roll, which ratio is approximately 2:1, the weight at the guide roll being about one-half of that at the drive roll. In rolling some materials this difference in weight is desirable, because the characteristics of the material are such that the first pass of a compaction roll should be made with fairly light pressures for the initial setting. After this first pass, the following roll can be much heavier without ill effect upon the material being rolled; and thus the roller is applied to the fresh material with the guide or light end of the machine leading. Many materials, however, such as soils, do not have the characteristics above outlined, and the guide roll has but little effect on them and functions chiefly in steering the machine; and in rolling such materials, there would therefore need be no differential between the weights at the guide and drive rolls of the machine.

It can be seen that the three-axle machine made in accordance with Patent No. 2,015,891 at no time has the weight distribution characteristics of a conventional two-axle machine, as outlined in the preceding paragraph, as the end guide roll, when released, would not have sufficient weight to set the material, and the weight at the center guide roll, carrying the extra weight of the overhanging end of the machine frame would be in excess of that determined by the ratio given, i. e., 2:1.

In my improved-three-axle roller, disclosed in the present application, free vertical flotation of both guide rolls is provided, when desired or required, and continuous weight equalization is maintained between the two guide rolls when they are thus simultaneously released for vertical flotation. Further, either guide roll can be fixedly raised above the tangent plane of the rolls, thus providing the exact characteristics of a conventional two-axle roller, when desired, plus the characteristics of a two-axle roller in which the weight on both the drive roll and the guide roll is the same.

When, as shown in Figs. 1, 4, 5 and 6, all three rolls are locked in a tangent plane, and one roll encounters a high spot in the material being rolled, one of the guide rolls loses contact with the material being rolled and extra weight is automatically transferred to the roll surmounting the high spot. If the high spot is eliminated by this extra pressure, all three rolls resume contact and the resulting road surface will be in a plane tangent to all three rolls. This represents the principle of the three-axle rollers and illustrates why an extra smooth surface is produced as compared to the work done by a two-axle machine. My improved machine functions in this present respect the same as the three-axle machine disclosed in Patent No. 2,015,891.

When, as in Fig. 7, both guide rolls are released from the tangent plane for vertical flotation, and the end guide roll engages a high spot R', the center guide roll 9 instead of being raised above the surface retains its contact with the ground. Figs. 7, 8 and 9 show the effect of releasing the guide rolls from the tangent plane of all three rolls, so that each roll will therefore follow the ground contour and both guide rolls 9 and 13 will carry equal weight. By means of the new equalizing bar 10, both guide rolls 9 and 13 are free to float vertically as dictated by the ground or pavement contour, whereas, in the machine disclosed by Patent No. 2,015,891 only the end guide roll was so adapted. In this respect it will be further noted that the mounting of the equalizing bar 10 in frame extension 1a is such that the weight at both of the guide rolls 9 and 13 is equalized. The weight on each of the guide rolls, when released for vertical flotation, is approximately equal to one half the weight at the drive roll, which suits the requirements of a conventional two-axle tandem roller and which distribution cannot be achieved in the machine disclosed in Patent No. 2,015,891 wherein only the end guide roll can be released from the tangent plane for vertical flotation.

Figs. 10 and 11 show the effect of that feature of my improved machine which permits locking either guide roll in a raised position, thus changing the characteristics of my machine to suit exactly those of a conventional two-axle machine with the weight ratio of 2:1, as in Fig. 10; or changing it to the characteristics of a two-axle machine with approximately equal weight on each end, as shown in Fig. 11.

The aforementioned weight equalization between the guide rolls when arranged for free vertical flotation, wherein the weight on each guide roll is approximately one half the weight on the drive roll, suiting the 2:1 weight distribution previously outlined, and the feature permitting selectively raising one of the guide rolls from the tangent plane, as mentioned in the preceding paragraph, cannot be achieved in the machine disclosed in Patent No. 2,015,891. Further, when the end guide roll 13 is held in an elevated position, as in Fig. 11, the center guide roll and the drive roll, both remaining in ground contact, apply approximately equal weight on the material being rolled. This also is a novel characteristic of my new machine, and is not present either in conventional two-axle machines or in the three-axle roller disclosed in Patent No. 2,015,891.

It can thus be seen my improved machine not only performs throughout the full range of the machine disclosed in Patent No. 2,015,891, but will also perform with pressures and actions of a two-axle machine. It further can be adapted to perform as a two-axle machine with equal weight on the drive roll and guide roll, the latter weight distribution being entirely new.

My new improved three-axle tandem will perform in three different manners. First, as a three-axle tandem as disclosed in Patent No. 2,015,891 (see Figs. 4, 5 and 6). Second, as an improvement over the above patented construction in which both the guide rolls 9 or 13 can be released for free vertical flotation and equal weight distribution can be maintained between the guide rolls when the machine is operating in this manner (see Figs. 7, 8 and 9). Third, as an improvement on the above patented construction in which either guide roll can be selectively raised and maintained in a position above the tangent plane of the other two rolls (see Figs. 10 and 11). This provides, (a) a two-axle machine, such as in Fig. 10, wherein the weight distribution is one-third on the guide roll and two-thirds on the drive roll, or, (b) a two-axle machine, such as in Fig. 11, wherein the weight at the guide roll and the drive roll is the same.

I do not limit my invention to the exact forms shown in the drawings, for obviously changes may be made therein within the scope of the claims.

I claim:

1. In a road roller; a frame; three rolls mounted in the frame in tandem relation; means driving one end roll, the other two rolls being steering rolls; a substantially horizontal equalizer beam disposed axially of the frame and horizontally pivoted adjacent its mid-point in bearings carried by the frame; a pair of vertical trunnions adjacent the respective ends of the beam disposed substantially equal distances from the beam pivot; yokes carrying said other two rolls and having king-pins journaled in said trunnions; means simultaneously pivoting said yokes to steer the road roller; and means in one position selectively locking said beam in positions to maintain the lower peripheries of the three rolls in a common plane, said means in another position maintaining either of said other two rolls elevated above the common plane of the lower peripheries of the remaining rolls.

2. In a road roller as set forth in claim 1, said pivoting means comprising a fluid cylinder on said beam; arms on said king-pins disposed transversely of the axis of the roller; a link pivotally connecting the respective arms; a piston rod having a piston movable in said cyilnder, said rod being pivotally connected to one of said arms; and a fluid circuit including a fluid pump and including said cylinder and including valve means directing fluid under pressure into either end of the cylinder.

3. In a road roller as set forth in claim 1, said locking means comprising a substantially vertically disposed cylinder on said frame; a piston rod having a piston in said cylinder, said rod being pivotally connected with the said beam; and a fluid circuit including a fluid pump and including said cylinder and including valve means directing fluid under pressure into either end of the cylinder.

4. In a road roller as set forth in claim 1, said locking means comprising a substantially vertical arm pivotally connected with said beam and extending upwardly through said frame, and a sliding bolt in said frame adapted to engage the arm and hold same in adjusted position.

5. In a road roller; a frame; three rolls mounted in the frame in tandem relation; means driving one end roll, the other two rolls being steering rolls; a substantially horizontal equalizer beam disposed axially of the frame and horizontally pivoted adjacent its mid-point in bearings carried by the frame; a pair of vertical trunnions adjacent the respective ends of the beam disposed substantially equal distances from the beam pivot; yokes carrying said other two rolls and having king-pins journaled in said trunnions; means simultaneously pivoting said yokes to steer the road roller; means in one position selectively locking said beam in positions to maintain the lower peripheries of the three rolls in a common plane, said means in another position maintaining either of said other two rolls elevated above the common plane of the lower peripheries of the remaining rolls; and means permitting the beam to float freely.

6. In a road roller as set forth in claim 5, said pivoting means comprising a fluid cylinder on said beam; arms on said king-pins disposed transversely of the axis of the roller; a link pivotally connecting the respective arms; a piston rod having a piston movable in said cylinder, said rod being pivotally connected to one of said arms; and a fluid circuit including a fluid pump and including said cylinder and including valve means directing fluid under pressure into either end of the cylinder.

7. In a road roller as set forth in claim 5, said locking means comprising a substantially vertically disposed cylinder on said frame; a piston rod having a piston in said cylinder, said rod being pivotally connected with the said beam; and a fluid circuit including a fluid pump and including said cylinder and including valve means directing fluid under pressure into either end of the cylinder.

8. In a road roller as set forth in claim 5, said locking means comprising a substantially vertically disposed cylinder on said frame; a piston rod having a piston in said cylinder, said rod being pivotally connected with the said beam; a fluid circuit including a fluid pump and including said cylinder and including valve means selectively directing fluid under pressure into either end of the cylinder;

and said permitting means including a duct connecting the ends of the cylinder; and a valve in said duct.

9. In a road roller as set forth in claim 5, said locking means comprising a substantially vertical arm pivotally connected with said beam and extending upwardly through said frame; and a sliding bolt in said holes adapted to engage the arm and hold same in adjusted position.

10. In a road roller; a frame; three rolls mounted in the frame in tandem relation; means driving one end roll; the frame having portions arched upwardly over the other two rolls; a substantially horizontal equalizer beam disposed axially of the frame and horizontally pivoted adjacent its mid-point in bearings carried by the arched portions; a pair of vertical trunnions adjacent the respective ends of the beam disposed substantially equal distances from the beam pivot; yokes carrying said other two rolls and having king-pins journaled in said trunnions; means simultaneously pivoting said yokes to steer the road roller; and means in one position selectively locking said beam in positions to maintain the lower peripheries of the three rolls in a common plane, said means in another position maintaining the beam in position to raise either of said other two rolls elevated above the common plane of the lower peripheries of the remaining rolls.

11. In a road roller as set forth in claim 10, said yoke pivoting means comprising a fluid cylinder on said beam; arms on said king-pins disposed transversely of the axis of the roller; a link pivotally connecting the respective arms; a piston rod having a piston movable in said cylinder, said rod being pivotally connected to one of said arms; and a fluid circuit including a fluid pump operated by said drive means, and including said cylinder, and including valve means selectively directing fluid under pressure into either end of the cylinder.

12. In a road roller as set forth in claim 10, said locking means comprising a substantially vertically disposed cylinder on said arched portions; a piston rod having a piston in said cylinder, said rod being pivotally connected with the said beam; and a fluid circuit including a fluid pump operated by said drive means, and including said cylinder, and including valve means selectively directing fluid under pressure into either end of the cylinder.

13. In a road roller as set forth in claim 10, said locking means comprising a substantially vertically disposed cylinder on said arched portions; a piston rod having a piston in said cylinder, said rod being pivotally connected with the said beam; a fluid circuit including a fluid pump operated by said drive means, and including said cylinder, and including valve means selectively directing fluid under pressure into either end of the cylinder; and said permitting means including a duct connecting the ends of the cylinder; and a valve in said duct.

14. In a road roller as set forth in claim 10, said locking means comprising a substantially vertical arm pivotally connected with said beam and extending upwardly through said arched portion; said arched portions having aligned holes; a sliding bolt in said holes adapted to enter any of a series of holes in the arm; and means sliding said bolt.

References Cited in the file of this patent
UNITED STATES PATENTS

| | | |
|---|---|---|
| 846,939 | Padgett | Mar. 12, 1907 |
| 1,999,665 | Schroeder | Apr. 30, 1935 |
| 2,089,591 | Aitken | Aug. 10, 1937 |
| 2,132,059 | Trembly | Oct. 4, 1938 |
| 2,386,025 | Wills | Oct. 2, 1945 |
| 2,433,268 | Fellabaum | Dec. 23, 1947 |